//UNITED STATES PATENT OFFICE 1,996,558

PRODUCTION OF TERPENES

Fritz Ulffers and Rudolf Erbe, Eberswalde, Germany, assignors to Schering-Kahlbaum A.-G., Berlin, Germany No Drawing. Application April 4, 1931, Serial No. 527,846. In Germany April 15, 1930

12 Claims. (Cl. 260—167)

Our invention refers to the production of terpenes and more especially to a method which allows producing such compounds from pinene.

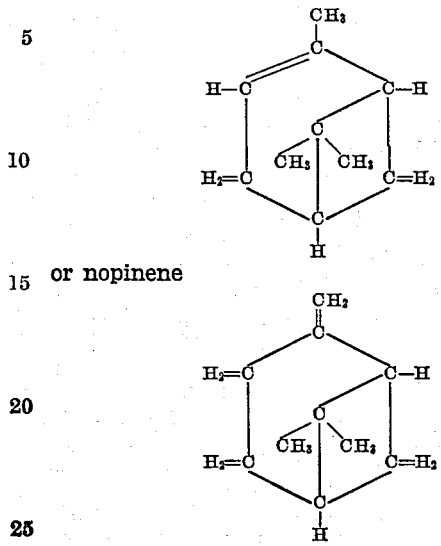

or nopinene

As is well known to those skilled in the art, if pinene or nopinene are treated with concentrated acids, addition compounds are formed, the acids entering into the combination and disappearing as such in the reaction mixture. The products thus obtained are acid esters of terpene alcohols, for instance the hydrochloric acid esters and the carboxylic acid esters.

We have now found that if nopinene or pinene are reacted with relatively small and in any case less than the equivalent quantities of an acid, or its derivatives of acid reaction, which combine with pinene or nopinene, if at all, only very slowly, these terpenes are converted by catalytic action into other valuable terpenes.

We have found that this catalytic action is possessed by the following compounds:

(1) Simple inorganic acids, such as boric acid, simple and complex silicic acids; amphoteric compounds, such as vanadic acid, meta-vanadic acid, antimonic acids, molybdic acids, titanic acids, phosphomolybdic acids, tungstic acids, and phosphotungstic acids; and complex acids of iron, etc.

(2) The acid or readily dissociating salts of inorganic acids, and of amphoteric acids, such as those mentioned above.

Each of these compounds may be used as a catalyst by itself, but mixtures of two or more of these compounds have proved useful also. In all cases the catalyst should be uniformly distributed in the reaction mixture by vigorous stirring.

As it is well known that catalysts may be poisoned by minute admixtures or may become unfit for use if applied in a disadvantageous form, for instance as coarse granules or with sintered surfaces, it is recommended to produce fresh catalysts for each individual case and to dry them.

Several of these catalysts act at low temperatures, for instance at 0° C. and below, while others will act for instance at 20° C. or above.

The nopinene or pinene disappears altogether from the reaction mixture. After nopinene has thus disappeared, there is obtained in the first phase of the reaction mainly pinene. In the second phase of the reaction pinene will disappear altogether and other terpenes, for instance camphene, will be formed.

In operating our invention we prefer proceeding for instance as follows:—

*Example 1*

1 kg. nopinene is heated to 100° C. and metavanadic acid is introduced under continuous vigorous stirring, about 0,5 grs. of the acid being introduced in intervals of about fifteen minutes, the temperature being always kept at 100° C. The addition of vanadic acid is stopped as soon as all the nopinene and all the pinene formed therefrom have disappeared. This will be the case after up to 5% by weight metavanadic acid, calculated upon the weight of nopinene, have been added.

If by chance some pinene should still be present, it can be made to disappear by simply continuing stirring at 100° C., or if desired at a slightly higher temperature.

When the reaction has come to an end, the terpenes which have formed, are recovered in the usual manner, mainly camphene being obtained besides other terpenes.

*Example 2*

1 kg. pinene is heated to 120° C. and under continuous vigorous stirring antimonic acid is introduced in portions of about 0,3 grs., the additions being made in half hour intervals, the reaction temperature being always kept at 120° C. After about 5% by weight, calculated on the pinene, of the catalyst have been introduced, stirring at 120° C. is continued until all pinene has disappeared, whereupon the mixture is allowed to cool down and the terpenes formed in the reaction are recovered in the usual manner. There is thus formed camphene, together with small quantities of other hydrocarbons and terpene alcohols.

*Example 3*

1 kg. pinene is well stirred at 20° C. and about 0,1 gr. phosphoromolybdic acid is introduced every half hour under continuous stirring, until about 4% by weight have been introduced. Stirring is continued, if necessary at 30° C., until all the pinene has been converted into other terpenes, whereupon the reaction mixture is allowed to cool down and the products formed are recovered in the usual manner.

*Example 4*

1 kg. pinene is heated to 130° C. and portions amounting to 0,5–1 gr. of tungstic acid are introduced in half hour intervals; so that after about 30–40 hours 6%, calculated on pinene of tungstic acid are contained in the reaction mixture. Stirring is continued at 130° C. until all the pinene has disappeared from the reaction mixture. If necessary, some more tungstic acid may be added. The mixture is then allowed to cool down and the reaction products are recovered as usual.

*Example 5*

1 kg. pinene is heated to 140° C.; under vigorous stirring about 5% by weight monocalcium phosphate are gradually introduced in small portions, the temperature being kept constant. After the pinene has disappeared from the mixture, this latter is allowed to cool down and the products of reaction are recovered in the usual manner.

*Example 6*

1 kilogram pinene is heated to boiling and 1 gram freshly prepared titanic acid is added in several portions, whereupon boiling at the reflux condenser is continued during 20–30 hours. The camphene forming in the reaction is isolated by fractional distillation.

In all cases nopinene and pinene may be replaced by oils containing one of these compounds.

Various changes may be made in the details disclosed in the foregoing specification without departing from the invention or sacrificing the advantages thereof.

We claim:—

1. The method of producing terpenes comprising reacting a material containing a body of the group formed by pinene and nopinene with less than the equivalent quantity of an inorganic compound of acid reaction which combines with such body, if at all, only very slowly.

2. The process of claim 1 wherein the inorganic compound of acid reaction is an amphoteric compound.

3. The method of producing terpenes comprising reacting a material containing a body of the group formed by pinene and nopinene with less than the equivalent quantity of an inorganic acid which combines with such body, if at all, only very slowly.

4. The process of claim 3 wherein the inorganic acid is an amphoteric acid.

5. The method of producing terpenes comprising reacting a material containing a body of the group formed by pinene and nopinene with less than the equivalent quantity of a salt of acid reaction of an inorganic acid which combines with such body, if at all, only very slowly.

6. The process of claim 5 wherein the salt of acid reaction of an inorganic acid is a salt of an amphoteric acid.

7. The method of producing terpenes comprising reacting a material containing a body of the group formed by pinene and nopinene with less than the equivalent quantity of a complex inorganic acid which combines with such body, if at all, only very slowly.

8. The process of claim 7 wherein the complex inorganic acid is an amphoteric acid.

9. The method of producing terpenes comprising reacting a material containing a body of the group formed by pinene and nopinene with less than the equivalent quantity of a salt of acid reaction of a complex inorganic acid which combines with such body, if at all, only very slowly.

10. The method of producing terpenes comprising reacting a material containing a body of the group formed by pinene and nopinene with less than the equivalent quantity of titanic acid.

11. The method of producing terpenes comprising reacting a material containing a body of the group formed by pinene and nopinene with less than the equivalent quantity of tungstic acid.

12. The method of producing terpenes comprising reacting a material containing a body of the group formed by pinene and nopinene with less than the equivalent quantity of antimonic acid.

FRITZ ULFFERS.
RUDOLF ERBE.